(12) United States Patent
Granziera

(10) Patent No.: US 9,038,589 B2
(45) Date of Patent: May 26, 2015

(54) METHOD FOR CONTROLLING A MICRO-HYBRID SYSTEM

(75) Inventor: Cyril Granziera, Paris (FR)

(73) Assignee: Valeo Equipement Electriques Moteur, Créteil Cedex (FR)

( * ) Notice: Subject to any disclaimer, the term of this patent is extended or adjusted under 35 U.S.C. 154(b) by 707 days.

(21) Appl. No.: 13/392,990

(22) PCT Filed: Jul. 26, 2010

(86) PCT No.: PCT/FR2010/051579
§ 371 (c)(1),
(2), (4) Date: Aug. 2, 2012

(87) PCT Pub. No.: WO2011/027058
PCT Pub. Date: Mar. 10, 2011

(65) Prior Publication Data
US 2012/0298062 A1 Nov. 29, 2012

(30) Foreign Application Priority Data
Sep. 2, 2009 (FR) ..................... 09 55974

(51) Int. Cl.
*F02N 11/04* (2006.01)
*F02N 11/08* (2006.01)
*F02D 41/20* (2006.01)

(52) U.S. Cl.
CPC .......... *F02N 11/04* (2013.01); *B60L 2240/421* (2013.01); *B60W 2510/081* (2013.01); *F02D 2041/2027* (2013.01); *F02D 2041/2044* (2013.01); *F02N 11/0814* (2013.01); *F02N 11/0859* (2013.01); *Y02T 10/642* (2013.01); *Y02T 10/48* (2013.01)

(58) Field of Classification Search
CPC ..... F02N 11/04; F02N 11/08; F02N 11/0814; F02N 11/0859; F02D 41/00; F02D 2041/2027; F02D 2041/2044; B60L 2240/421
USPC ............ 123/179.3, 179.12, 352; 318/400.11, 318/400.12, 400.14, 430–431; 290/31
See application file for complete search history.

(56) References Cited

U.S. PATENT DOCUMENTS

| 8,175,791 B2* | 5/2012 | Lecole et al. ............... 701/112 |
| 8,583,321 B2* | 11/2013 | Ranier et al. ................ 701/36 |
| 8,674,633 B2* | 3/2014 | Rouis .................... 318/400.11 |

FOREIGN PATENT DOCUMENTS

| DE | 10 2006 057892 A1 | 6/2008 |
| FR | 2 875 556 A1 | 3/2006 |
| FR | 2 925 128 A1 | 6/2009 |
| FR | 2 925 618 A1 | 6/2009 |
| GB | 2 363 266 A | 12/2001 |

* cited by examiner

*Primary Examiner* — Hieu T Vo
(74) *Attorney, Agent, or Firm* — Berenato & White, LLC

(57) ABSTRACT

A method of controlling a vehicle associated micro-hybrid system. The system includes a reversible rotary electrical machine that is connected to a thermal engine of a motor vehicle. The method includes: controlling a step of pre-fluxing of a rotor of the reversible rotary electrical machine when a control module receives an instruction to start the thermal engine via the reversible rotary electrical machine; measuring a speed of the rotor of the reversible rotary electrical machine; and, demanding stoppage of the pre-fluxing step when the speed of the rotor is greater than or equal to a predetermined speed threshold value. The method avoids the generation of overvoltages in an electrical distribution network formed by an onboard network of the vehicle and by an energy storage unit of the micro-hybrid system.

10 Claims, 1 Drawing Sheet

METHOD FOR CONTROLLING A MICRO-HYBRID SYSTEM

CROSS-REFERENCE TO RELATED APPLICATIONS AND CLAIM TO PRIORITY

This application relates to International Application No. PCT/FR2010/051579 filed Jul. 26, 2010 and French Patent Application No. 09/55974 filed Sep. 2, 2009, of which the disclosures are incorporated herein by reference and to which priority is claimed.

FIELD OF THE INVENTION

The invention concerns a method of controlling a micro-hybrid system comprising a reversible rotary electrical machine, in particular an alternator-starter, able to be connected to a thermal engine of a motor vehicle.

The invention also concerns a module for controlling the micro-hybrid system, and this system.

BACKGROUND OF THE INVENTION

As is known in the prior art, the alternator-starter machine comprises a rotor sized so as to be able, in starting mode, to start the thermal engine. An excitation coil of the rotor is supplied with a pulse width modulated (PWM) excitation current having a duty cycle changing between 0 and 100%. In alternator mode, the machine functions with a duty cycle from 0 to 50%. In pre-fluxing mode or in electric motor mode, the machine can be controlled with a duty cycle of 100% so as to obtain a maximum mechanical torque in order to rotate the thermal engine and start it.

Micro-hybrid vehicle systems are known comprising an alternator-starter and an auxiliary starter. For cold starts of the thermal engine, use of either the auxiliary starter alone or the auxiliary starter and the alternator-starter operating in concert is known.

When the auxiliary starter and the alternator-starter operate in concert, in a first phase the auxiliary starter alone commences the driving of the thermal engine and, simultaneously, a pre-fluxing excitation current is supplied to the rotor of the alternator-starter in order to prepare it for functioning in motor mode. In a second phase, if necessary, that is to say in the case where the thermal engine has not started during the first phase, the alternator-starter can participate in the driving of the thermal engine and finalise the starting thereof.

During the pre-fluxing step, the rotor of the machine can be pre-fluxed with a duty cycle of 100% without supplying any torque. In other words, the alternator-starter then functions in generator mode with a duty cycle much greater than 50%, that is to say beyond a maximum excitation generally acceptable in generator mode. There are therefore, in this known micro-hybrid system, risks of generating overvoltages, firstly on an onboard network of the vehicle and secondly at the terminals of an energy storage unit of the system, in particular a battery, this network and battery being supplied electrically by the alternator-starter when the latter functions in generator mode.

Such a situation can also occur in the case of an instruction to restart the thermal engine occurring little after an instruction to stop the said engine, when the latter does not yet have a zero rotation speed. In such a case, the thermal engine being hot, the starting thereof is attempted only with the alternator-starter. The rotor pre-fluxing step is carried out prior to a supply to the stator windings of the machine and the machine functions as a generator during this step where the thermal engine is still turning over because of the inertia thereof. Injection of fuel into the thermal engine being immediately re-established following the instruction to restart it, a starting of the thermal engine hot can occur while the pre-fluxing step is under way with a duty cycle of 100%, causing an increase in speed of the machine and risks of generating overvoltages.

The invention aims to remedy the aforementioned drawbacks.

SUMMARY OF THE INVENTION

According to a first aspect, the invention concerns a method of controlling a micro-hybrid system comprising a reversible rotary electrical machine that can be connected to the thermal engine of a motor vehicle, and a control module.

According to the invention, the method comprising the following steps:
controlling a step of pre-fluxing of a rotor of the reversible rotary electrical machine when the control module receives an instruction to start the thermal engine via the reversible rotary electrical machine,
measuring a speed of the rotor of the reversible rotary electrical machine,
demanding stoppage of the pre-fluxing step when the speed of the rotor is greater than or equal to a predetermined speed threshold value.

By virtue of the invention, it is possible, during this pre-fluxing step, to avoid the generation of overvoltages, on an electrical distribution network, in particular formed firstly by an onboard network of the vehicle, this network being provided in particular with electrical consumers, and secondly by an energy storage unit of the micro-hybrid system. This distribution network is supplied electrically by the alternator-starter when it functions in generator mode.

This is because, during the pre-fluxing step, the reversible rotary electrical machine functions in generator mode and has a duty cycle of 100% corresponding to a maximum duty cycle defined for the motor mode of this machine.

Thus this preparation step central to the starting of the thermal engine via the reversible rotary electrical machine could generate overvoltages in the micro-hybrid system if it were not stopped, since there is no voltage regulation during this step.

According to one embodiment of the invention, the predetermined speed threshold value may correspond substantially to the speed of the rotor at which the reversible rotary electrical machine begins to provide an electrical supply.

This electrical supply can preferably be directed to at least one out of the vehicle onboard network and the energy storage unit.

According to one embodiment of the invention, the method can control a step of inhibiting the pre-fluxing step, in particular in order to prevent this step being repeated before the thermal engine starts.

If required, the method can control a step of starting the thermal engine via the reversible rotary electrical machine by actuating the motor mode of this machine.

In this case, the method can control the machine so that it has a duty cycle of 100% by supplying a torque to the thermal engine.

For this purpose, the method can control an AC to DC converter of the micro-hybrid system, this converter being connected to the reversible rotary electrical machine.

It is also said that the converter functions in inverter mode.

In a variant, the method can control an idle step of the reversible rotary electrical machine by keeping the generator mode of this machine.

In this case, the method can control the machine so that it has a duty cycle less than or equal to 50% while supplying electrical energy.

The method can preferably control the machine so that it has a zero duty cycle during a predetermined so-called safety period.

Where applicable, the idle step is assimilated to a step of stoppage of the machine.

When the method demands the idle or stop step of the reversible rotary electrical machine, then this method can demand the starting of the thermal engine by the auxiliary starter of the micro-hybrid system.

According to another aspect, the invention concerns a control module of a micro-hybrid system comprising a reversible rotary electrical machine that can be connected to the thermal engine of a motor vehicle, this control module being arranged to:
- control a step of pre-fluxing of a rotor of the reversible rotary electrical machine when the control module receives an instruction to start the thermal engine via the reversible rotary electrical machine,
- measure a speed of the rotor of the reversible rotary electrical machine,
- demand stoppage of the pre-fluxing step when the speed of the rotor is greater than or equal to a predetermined speed threshold value.

According to yet another aspect, the invention concerns a micro-hybrid system for a motor vehicle, comprising:
- a reversible rotary electrical machine, in particular an alternator-starter,
- a control module as described above.

According to an example embodiment of the invention, the control module can be integrated on the reversible rotary electrical machine.

According to another example embodiment of the invention, the micro-hybrid system can comprise an energy storage unit connected to the reversible rotary electrical machine.

The micro-hybrid system can preferably comprise an auxiliary starting device able to start the thermal engine.

Another subject of the invention is a motor vehicle comprising a micro-hybrid system as described above.

BRIEF DESCRIPTION OF THE DRAWINGS

The invention can be better understood from a reading of the following detailed description of non-limitative example embodiments of the invention, and an examination of the accompanying drawing, in which.

DETAILED DESCRIPTION

Figure 1:
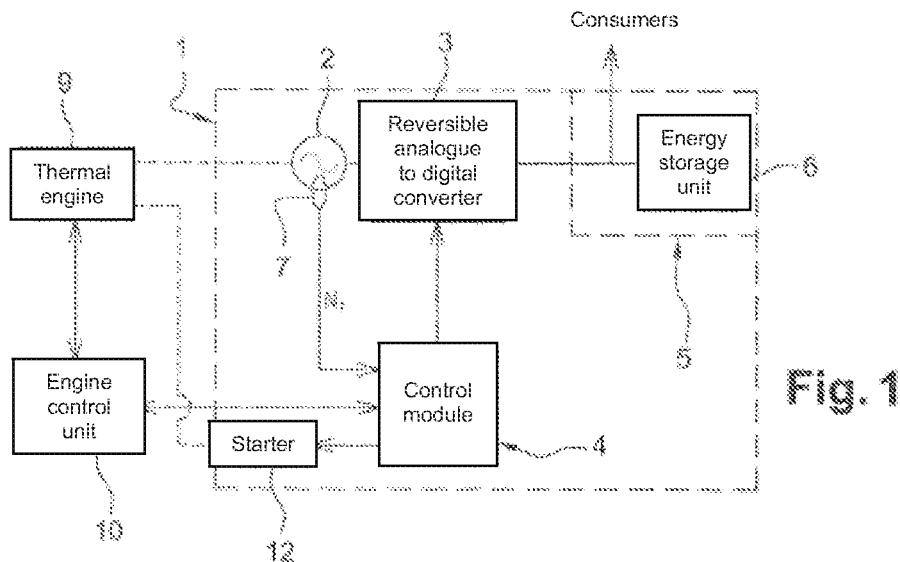
FIG. 1 shows, schematically and partially, a micro-hybrid system according to the invention, and FIG. 2 corresponds to a block diagram illustrating various operating steps of the system of FIG. 1.

FIG. 1 shows a micro-hybrid system 1 comprising a multiphase reversible rotary electrical machine 2, a reversible power converter of the AC to DC type 3, a control module 4 and an electrical distribution network 5.

The multiphase reversible rotary electrical machine 2 is, in the example considered, formed by a motor vehicle alternator-starter comprising a rotor and a stator.

This alternator-starter can be formed by a reversible synchronous machine.

The alternator-starter 2 is, apart from being rotated by a thermal engine 9 in order to produce electrical energy (alternator mode), capable of transmitting a torque to this thermal engine 2 for starting (starter mode).

The alternator-starter 2, the converter 3 and the electrical distribution network 5 are connected in series.

The electrical distribution network 5 comprises an energy storage unit 6.

The energy storage unit 6 can comprise a conventional supply battery, for example of the lead battery type or in a variant a supercapacitor. This battery 6, apart from supplying the alternator-starter during a starting phase (motor mode), supplies electrical energy to electrical consumers of the vehicle, for example headlights, a car radio, an air conditioning device and wipers.

The converter 3 allows bidirectional transfers of electrical energy between the alternator-starter 2 and the battery 6, these transfers being in particular controlled by the control module 4 connected to the converter 3.

The control module 4 of the micro-hybrid system 1 can be constructed around a microprocessor associated with a control means.

The control module 4 is connected to an engine control unit 10 able to manage the thermal engine 9.

The engine control unit 10 is able to receive information representing a state of the engine 9, in particular via measuring means arranged in particular on the said engine 9.

This information corresponds to parameters such as the speed of the engine 9, the ambient engine temperatures and the actions of the vehicle driver.

According in particular to these parameters, the engine control unit 10 sends instructions to the control module 4.

For example, this instruction may correspond to a demand to start the thermal engine 9 via the alternator-starter 2.

Figure 2:
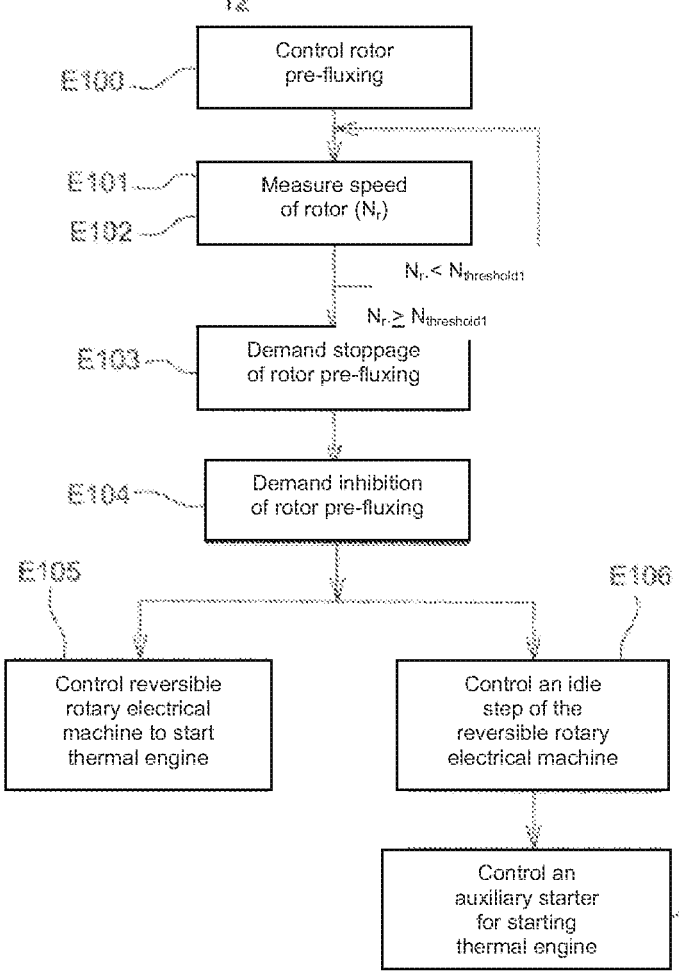

The method of starting the engine 9 will now be described in detail with reference to FIG. 2.

In the example described, when a demand to start the thermal engine 9 arises, the control module 4 demands a pre-fluxing of the rotor of the alternator starter 2, at a step E100.

During the pre-fluxing step, the alternator-starter functions in generator mode and has a duty cycle of 100%, corresponding to a maximum duty cycle defined for the motor mode of this alternator-starter.

At a step E101, the module 4 controls a speed, in particular angular, of the rotor of the alternator-starter 2, referred to as $N_r$.

For this purpose, the module 4 obtains at this step E101 the speed $N_r$ that comes from a sensor 7 connected to the module 4.

The sensor 7 is preferably placed close to the rotor of the alternator-starter 2.

The speed $N_r$ is then transmitted to the module 4, which will load it and store it in a memory, in particular volatile, for example of the RAM type.

This memory is preferably located in this module 4.

The module 4, at a step E102, compares the speed $N_r$ with a first predetermined speed threshold value $N_{threshold1}$.

This speed $N_{threshold1}$ may for example lie within the range of values [750 rev/min; 1500 rev/min].

Advantageously, the speed $N_{threshold1}$ corresponds substantially to the rotor speed at which the alternator-starter is capable of outputting a supply current directed towards the electrical distribution system 5.

If the speed $N_r$ is greater than or equal to the speed $N_{threshold1}$ then the control module 4, at a step E103, demands the stoppage of the pre-fluxing of the rotor.

Thus it is possible to prevent, during the starting of the thermal engine 9 via the alternator-starter 2, the generation of overvoltages to the electrical distribution system.

If the comparison calculation results in a speed $N_r$ less than the speed $N_{threshold1}$ then the control module 4 once again controls the speed $N_r$ until it becomes greater than or equal to $N_{threshold1}$.

The module 4 then, at a step E104, demands the inhibition of the pre-fluxing in order to prevent a new pre-fluxing step being repeated before the starting of the thermal engine 9 has ended.

The module 4 must next control the alternator-starter 2 so as to finish the phase of starting the thermal engine 9.

For this purpose, the control module 4, at a step E105, controls the motor mode of the alternator-starter, by acting on the AC to DC converter 3, so as to start the thermal engine 9.

In this case, the alternator-starter 2 can have a duty cycle of 100%, supplying a torque to the thermal engine 9.

In a variant of step E105, the module 4, at a step E106, demands an idle state of the alternator-starter 2, keeping the generator operating mode thereof.

In this case, the module 4 acts on the converter 3 so that the alternator-starter 2 has a duty cycle less than or equal to 50%, supplying electrical energy.

Preferably, this duty cycle will have a zero value during a predetermined so-called safety period. Where applicable, the idle step E106 is assimilated to a step of stoppage of the alternator-starter 2.

To start the thermal engine 9, the engine control unit 10 controls, in particular via the control module 4, an auxiliary starter 12, visible in FIG. 1, supplied by the battery 6 and connected firstly to the control module 4 and secondly to the thermal engine 9.

The invention claimed is:

1. A control module (4) of a micro-hybrid system (1), comprising a reversible rotary electrical machine (2) connected to a thermal engine (9) of a motor vehicle, the control module comprising:
   means for controlling a step of pre-fluxing of a rotor of the reversible rotary electric machine when the control module receives an instruction to start the thermal engine via the reversible rotary electrical machine,
   means for measuring a speed of the rotor ($N_r$) of the reversible rotary electrical machine, and
   means for demanding stoppage of the pre-fluxing step when the speed of the rotor is greater than or equal to a predetermined speed threshold value ($N_{threshold1}$).

2. A method of controlling a micro-hybrid system (1) comprising a reversible rotary electrical machine (2) connected to a thermal engine (9) of a motor vehicle, and a control module, the method comprising the following steps:
   controlling a step of pre-fluxing of a rotor of the reversible rotary electrical machine when the control module receives an instruction to start the thermal engine via the reversible rotary electrical machine,
   measuring a speed ($N_r$) of the rotor of the reversible rotary electrical machine, and
   demanding stoppage of the pre-fluxing step when the speed of the rotor is greater than or equal to a predetermined speed threshold value ($N_{threshold1}$).

3. The method according to claim 2,
   wherein the predetermined threshold value ($N_{threshold1}$) corresponds substantially to the speed of the rotor ($N_r$) at which the reversible rotary electrical machine (2) commences providing an electrical supply, in particular to an electrical distribution network (5) of the motor vehicle.

4. The method according to claim 2,
   further comprising a step of inhibiting the pre-fluxing step in order to prevent the prefluxing step being repeated before the thermal engine (9) starts.

5. The method according to claim 2,
   further comprising a step of starting the thermal engine (9) via the reversible rotary electrical machine (2) by actuating the motor mode of the rotary electrical machine.

6. The method according to claim 5,
   further comprising a step of controlling a duty cycle of the machine (2) at a value of 100% while supplying torque to the thermal engine (9).

7. The method according to claim 2,
   further comprising a step of idle state of the reversible rotary electrical machine (2) while keeping the generating mode of the rotary electrical machine.

8. The method according to claim 7,
   further comprising a step of controlling a duty cycle of the rotary electrical machine (2) at a value less than or equal to 50% while supplying electrical energy.

9. The method according to claim 8,
   further comprising a step of starting the thermal engine (9) with an auxiliary starter (12) of the micro-hybrid system (1).

10. The method according to claim 9,
   wherein the method controls an AC to DC converter (3) of the micro-hybrid system (1), the converter is connected to the reversible rotary electrical machine (2).

* * * * *